US008853625B2

(12) United States Patent
Grieger

(10) Patent No.: US 8,853,625 B2
(45) Date of Patent: Oct. 7, 2014

(54) METHOD FOR THE DETECTION OF INCORRECT DEPOSITION ON A MALDI SAMPLE SUPPORT

(71) Applicant: Bruker Daltonik GmbH, Bremen (DE)

(72) Inventor: Marcus Grieger, Grasberg (DE)

(73) Assignee: Bruker Daltonik GmbH, Bremen (DE)

( * ) Notice: Subject to any disclaimer, the term of this patent is extended or adjusted under 35 U.S.C. 154(b) by 0 days.

(21) Appl. No.: 14/107,854

(22) Filed: Dec. 16, 2013

(65) Prior Publication Data

US 2014/0175273 A1 Jun. 26, 2014

(30) Foreign Application Priority Data

Dec. 20, 2012 (DE) ........................ 10 2012 025 046

(51) Int. Cl.
*H01J 49/00* (2006.01)
*H01J 49/04* (2006.01)
*B01D 59/44* (2006.01)

(52) U.S. Cl.
CPC .................................. *H01J 49/0418* (2013.01)
USPC ............ 250/288; 250/282; 250/281; 250/287

(58) Field of Classification Search
CPC . H01J 49/0431; H01J 49/0031; H01J 49/164; H01J 2237/24435; H01J 49/00; H01J 49/025; H01J 49/063; H01J 49/40; H01J 49/421
USPC .................................. 250/288, 282, 281, 287
See application file for complete search history.

(56) References Cited

U.S. PATENT DOCUMENTS

| | | | | |
|---|---|---|---|---|
| 6,175,112 B1 * | 1/2001 | Karger et al. | | 250/288 |
| 6,674,070 B2 * | 1/2004 | Karger et al. | | 250/288 |
| 6,825,463 B2 * | 11/2004 | Karger et al. | | 250/288 |
| 2002/0191864 A1 | 12/2002 | Lennon et al. | | |
| 2004/0183006 A1 | 9/2004 | Boraas et al. | | |
| 2007/0141719 A1 | 6/2007 | Bui | | |
| 2008/0017793 A1 | 1/2008 | James et al. | | |
| 2009/0266980 A1 | 10/2009 | Sano | | |
| 2010/0176288 A1 | 7/2010 | Barnes et al. | | |

* cited by examiner

*Primary Examiner* — Nikita Wells
(74) *Attorney, Agent, or Firm* — Robic, LLP

(57) ABSTRACT

The invention relates to a method for the detection of incorrect deposition on a MALDI sample support with several separate sample sites, where after the preparation on the sample support, an area located between two sample sites is sampled with a desorption laser, and a signal of an ion detector in a mass spectrometer is acquired in temporal relation to the sampling. The signal is examined for the presence of a signal which indicates incorrect deposition. An advantage of the method is particularly that it can be carried out using a MALDI ion source and a connected mass analyzer, and that it requires little procedural effort.

20 Claims, 3 Drawing Sheets

METHOD FOR THE DETECTION OF INCORRECT DEPOSITION ON A MALDI SAMPLE SUPPORT

BACKGROUND OF THE INVENTION

1. Field of the Invention

The invention relates to a method for the detection of incorrect deposition on a MALDI sample support with several separate sample sites. The invention furthermore relates to methods for the mass-spectrometric detection of analyte molecules with integrated detection of contamination on the MALDI sample support.

2. Description of the Related Art

Matrix-assisted laser desorption/ionization (MALDI) is a method of ionizing molecules. Since first being developed in the 1980s, it has become more and more important for the mass spectrometry of large molecules and polymers as well as biopolymers, such as proteins.

MALDI is based on the simultaneous crystallization of a matrix substance and an analyte substance with a 100- to 100,000-fold molar excess of matrix molecules. Analyte molecules are embedded into the crystals of the MALDI matrix as it forms. Successful, simultaneous crystallization typically requires a matrix/analyte ratio of around $10^4$ to 1. Small organic molecules which strongly absorb energy at the laser wavelength used, for example nitrogen lasers at a wavelength of 337 nm, are regularly selected as matrix substances. Examples are sinapic acid, 2,5-dihydroxybenzoic acid or α-cyano-4-hydroxycinnamic acid. The excitation is performed using short, high-energy laser pulses, of two to five nanoseconds pulse duration, for example. After relaxation in the crystal lattice, the excitation leads to explosive particle detachments at the surface of the crystal. The embedded analyte molecules are thus released together with the matrix and ionized. The ionized analyte molecules are thus converted into the gaseous phase and can then be transferred into the vacuum of a mass spectrometer and analyzed mass-spectrometrically.

The important aspects for a mass-spectrometric measurement in which the ions are produced by MALDI are the type of sample preparation and the method of applying of the samples onto the sample support, which is often made of metal, or occasionally of semiconductor material or electrically conductive plastic. There are various ways to apply the sample, such as the dried droplet method or thin layer preparation, which are all known in the Prior Art and shall not be dealt with further here.

MALDI samples are usually prepared on flat sample supports with a specific number of separate sample sites, which are typically arranged in a grid. The number can vary from 96 to 384 to 1536 sample sites, for example, depending on the design of the sample support. Deposition errors can occur when a sample is being prepared on such a sample site, especially when the matrix solution is being applied. It is possible, for example, for matrix solution to overflow from one sample site to another sample site that is not actually intended to be spotted because the volume of matrix solution exceeds the capacity of the targeted sample site. With automated dispenser units, in particular, there is an additional risk that a dispensed liquid volume is not deposited accurately onto a sample site but away from its center, onto the sample support, because the positioning device is inexact. Incorrect deposition can also be caused by a dispenser capillary releasing a volume of liquid not along the axis of the capillary but at an angle to it if, for example, the capillary tip has become partially clogged, and is thus geometrically constricted in an unpredictable way.

All the above-mentioned causes of incorrect deposition may result in a sample not being prepared on the intended site on the sample support, but outside it, which increases the risk of cross-contamination. In all cases it is highly probable that the area on the sample support between the individual sample sites, which should really remain free of sample and/or matrix substance and thus of contamination, is affected by the incorrect depositions.

The Prior Art, for example the patent publications EP 1 763 061 A2 and US 2002/0191864 A1, discloses that when sample preparation has been completed, a sample support is examined by means of a camera and connected image analysis unit to detect the presence and location of applied samples, as explained in Paragraph 0056 of the European patent application, for example. FIG. 4 of the US American patent application shows, by way of example, what MALDI depositions can look like. The prepared sample identified with the reference labels 16b and 16e, in particular, must be considered as critical because they are simultaneously close to two adjacent sample sites and can thus falsify the assignment of sample to sample site on the MALDI sample support. The sample with the reference label 16c is also fundamentally unfavorable because a large part of the sample volume is outside the area of the site which is intended for the sample application. This means that it can take a long time until the desorption laser, which is scanning the sample site, is directed at a point on the sample support which is spotted with a sample and is thus productive. It can also be the case that not enough productive points are bombarded and therefore the mass-spectrometric signal recorded has a high proportion of noise.

In order to implement the principles of the ideas explained in the documents listed above, optical images of the spotted sample supports must be taken and evaluated, which significantly increases the procedural effort for a MALDI ionization. There is therefore a need to specify alternative methods for the detection of incorrect depositions or contamination on MALDI sample supports which require less time and effort and can, in particular, be carried out with the available instruments, comprising a MALDI ion source and a connected mass spectrometer or mass analyzer.

SUMMARY OF THE INVENTION

According to a first aspect, the invention relates to a method for the detection of incorrect deposition on a MALDI sample support with several separate sample sites, where, after the preparation on the sample support, an area located between two sample sites is sampled with a desorption laser, and a signal of an ion detector in a mass spectrometer is acquired in temporal relation to the sampling. The signal is examined for the presence of a signal shape which indicates incorrect deposition.

In a simple embodiment, the signal recorded by the ion detector has a mass-independent intensity value, and the signal shape indicating incorrect deposition is an intensity value above an intensity threshold that is essentially determined by noise. The noise here can be caused by the electronics or by rare, but omnipresent, background ions (chemical noise). The noise can be characterized according to the specific instrument. This embodiment implies that, in a clean state, the areas between sample sites do not produce ions under laser bombardment, so the ion detector delivers a zero signal (i.e. one which contains nothing except noise or background signal). If, however, ions are produced by laser bombardment of the area between sample sites, they do not need to be detected mass-specifically in this version, which simplifies the operation of the mass spectrometer. An intensity which is above the noise is sufficient on its own to indicate incorrect deposition. In a slightly modified version, the mass spectrometer is in principle operated mass-specifically so that a mass resolution at the ion detector is possible, but the acquisition range or interrogation range of the ion detector can be limited to a very small m/z range (possibly to a single channel or a time increment which corresponds to a narrow range of atomic mass units u in each case), whose intensity value is used as the detector signal for the evaluation. The term mass-independent has a broad meaning in this respect.

In an alternative embodiment, the signal recorded by the ion detector comprises a mass-resolved mass spectrum, and the signal shape indicating incorrect deposition is an ion signature in the mass spectrum which deviates from a predetermined reference signature.

Preparation can comprise the application of matrix substance or of analyte substance dissolved or suspended in matrix liquid. The term "sample" in conjunction with the term "preparation" must be understood in a correspondingly broad sense. Here, sampling is understood as the process whereby the desorption laser is directed at a specific area of the sample support; the power density of the emitted laser light is set or adjusted, where necessary; the desorption laser is activated (in pulse mode, where necessary); any ions produced are fed through a mass spectrometer or a mass analyzer to an ion detector, where they are measured either independently of mass or resolved according to m/z masses (or not measured if, for example, a bare metal area of the sample support is sampled; the signal of the ion detector is in any case recorded or interrogated in temporal relation to the laser bombardment; a mass spectrum is acquired, where applicable).

Fundamentally, the acquisition of ion signals and mass spectra can refer to individual signals and mass spectra, or to sum signals and sum mass spectra generated by summing the individual signals or individual mass spectra obtained with the aid of repeated activation of the desorption laser at essentially the same sampling point. Sum signals and sum mass spectra are especially characterized by an improved signal-to-noise ratio. Ion signals or matrix ion signatures can often be identified in individual measurements also, i.e. they are distinguishable from the background.

According to one embodiment of the method, the presence of MALDI matrix ions, for example a matrix ion signature, in a mass-resolved mass spectrum is defined as an indication of incorrect deposition. The mass-resolved detection of matrix ions at a point on the sample support where no matrix should be is a good indication that the preparation was carried out imprecisely or incorrectly for whatever reasons. A mass window of the mass spectrometer, i.e., the region which transmits ions with certain masses m/z to the ion detector, can be adapted to the matrix ions that are expected in the event of incorrect deposition. If matrix ions have high intensities in certain mass ranges, which makes them easier to detect, the mass window can be designed for these mass ranges. An example would be the range below 1000 atomic mass units for singly charged matrix ions.

According to a further embodiment of the method, the areas between sample sites are coated with a substance which has a characteristic ion signature. A difference between the characteristic ion signature and the ion signature in the mass-resolved mass spectrum is furthermore defined as an indication of incorrect deposition. In particular, the substance exhibiting a characteristic ion signature can be a matrix substance which differs from the matrix substance used to prepare samples on the sample support.

In this version a different reference signal is defined as an indication of an uncontaminated area between sample sites to the one used in a version with an uncoated, bare sample support surface (usually metal). A deviation of the measured signal, or the ion signature found therein (if mass-resolved), from the reference signal, or the reference ion signature contained therein, which exceeds a specific tolerance is taken to be a deposition error or contamination. The evaluation of the measured signals, in particular the comparison of a measured mass spectrum with a stored reference mass spectrum, can utilize algorithms, for example peak picking, which are known in the Prior Art and shall not be explained in more detail here.

It shall be mentioned here that metal ions, for example $Fe^{+}$, can also be produced by the laser bombardment of a bare metal surface if the desorption laser has certain high power densities, and these ions can be detected mass-spectrometrically in a very low m/z mass range. In the case of metal sample supports without prior deposition of the area between sample sites, the (exclusive) presence of such metal ions can therefore serve as a reference signal for a clean area (=no deposition error).

In various embodiments, the adjacent sample sites are digitally or electronically labeled when a signal shape indicating incorrect deposition is detected from an area between sample sites. In this way, a digital or electronic storage medium, such as a chip assigned to the sample support, can be used to record—with spatial or grid resolution—whether incorrect deposition or contamination events are present which should be taken into account when evaluating the mass-spectrometric measurement data of the analyte molecules obtained from this prepared sample support.

In further embodiments, an area around a sample site can be sampled with the desorption laser along the whole of its periphery and examined for incorrect depositions before the sample site is investigated analytically. The density of the sampling points around the sample site can be selected particularly according to the repetition rate of the desorption laser used, e.g., a solid-state laser, depending on the time which can be afforded for the incorrect deposition test. Furthermore, the individual ion detector signals acquired from different locations on the area around a sample site can also be summed before the resulting detector signal is examined for suspicious signal shapes or ion signatures. This version is particularly advantageous when the reference signal indicating cleanliness is a zero signal or a zero spectrum, because the absolute intensity values in such acquisitions remain within manageable counter ranges. Ion signals or ion signatures which appear in only a few, or even in only one, of the recorded detector signals can nevertheless be recognized and detected in the summed detector signal also.

Alternatively, it is possible to sample a selected point on an area between two adjacent sample sites with the desorption laser and examine it for incorrect depositions. This allows a cursory but rapid random sampling test for contamination and is an easy way of helping to avoid measurement results which are falsified by cross-contamination.

In a variety of embodiments, a positioning device aligns the sample support and the light beam guide of the desorption laser with respect to each other in such a way that the desorption laser can be directed at an area between sample sites. The positioning device can comprise an XY stage, for example, which is assigned to the sample support, and/or tilting (micro) mirrors, for example, as part of the light beam guide of the desorption laser. It goes without saying that, depending on the application, either the sample support itself, the light beam itself, or both simultaneously, can be directed or adjusted in order to set a relative position between sample support and laser beam, or in other words to align the laser beam onto a specific point on the sample support.

In various embodiments, the repetition rate of the desorption laser is one to ten kilohertz, or higher where necessary. For high repetition rates, in particular, the time needed for the contamination test is hardly significant in relation to the actual analysis of the analyte molecules on the sample sites, so the contamination test can easily be included in an analytical measurement algorithm. The method of testing for contamination can, particularly, be automated so that the active involvement of a person is not required.

In accordance with a second aspect, the invention relates to a method for the mass-spectrometric detection of analyte molecules ionized by MALDI. A sample support which has several separate sample sites, and which is prepared with samples, is provided. A desorption laser is directed at different sample sites in succession and activated in order to ionize any analyte molecules which were prepared there. An area around the next sample site to be bombarded is sampled with the desorption laser in order to determine whether contamination is present by means of a signal of an ion detector in a mass analyzer. This signal is interrogated in temporal relation to the sampling. If the danger of contamination is indicated by a corresponding detector signal from the area between sample sites, appropriate countermeasures or precautionary measures can be initiated. All measures and embodiments described above can especially be suitably integrated into this analytical measurement method.

BRIEF DESCRIPTION OF THE DRAWINGS

The invention is now explained in more detail with the aid of the enclosed drawings. The elements in the illustrations are not necessarily shown to scale. The focus is more on illustrating the principle of the invention (often in a schematic way). The same reference labels generally describe the same elements in the different representations.

DETAILED DESCRIPTION

While the invention has been shown and described with reference to a number of embodiments thereof, it will be recognized by those skilled in the art that various changes in form and detail may be made herein without departing from the spirit and scope of the invention as defined by the appended claims.

Figure 1:
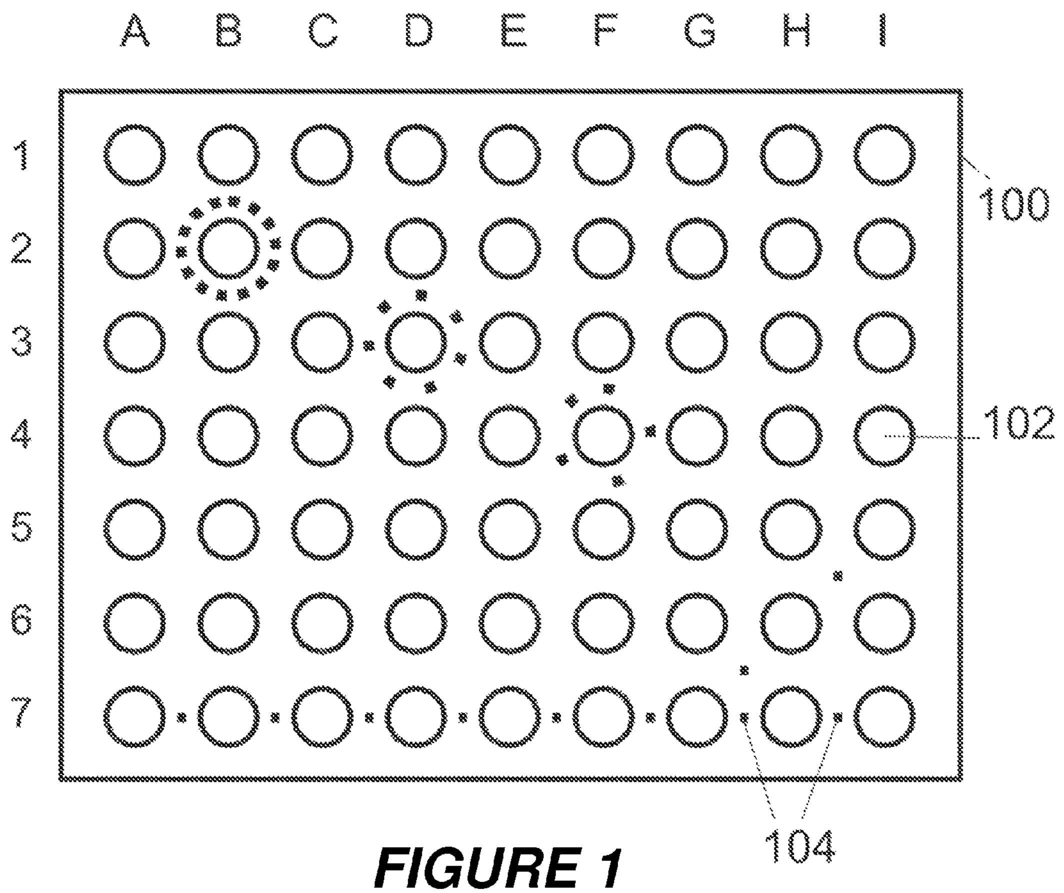
FIG. 1 shows a MALDI sample support in plan view, on which possible sampling points of the desorption laser are shown.

FIG. 1 shows, by way of example, a rectangular sample support plate 100 with 63 (columns A-I; rows 1-7) circular sample sites 102 in plan view. The shape of the sample support and/or the number and arrangement of the sample sites on the sample support are only to be understood as an example, of course. There can be a large variety of deviations from the embodiment explicitly shown here without deviating from the principle of the invention.

The circular sample sites 102 are intended to hold the prepared samples. The sample sites 102 can be surrounded by a milled-in groove, for example, to largely prevent the matrix solution from flowing away; they can additionally, or alternatively, be hydrophilic, in contrast to the areas between sample sites, which have a hydrophobic coating. These areas serve to provide a spatial demarcation from adjacent sample sites, among other things. Normally the prepared samples should not touch these areas. If this does happen despite all the care taken in the sample preparation, the risk of cross-contamination thus created can be detected by the method explained as part of this disclosure without excessive procedural effort, in particular without having to resort to any further devices in addition to the MALDI ion source and a mass analyzer.

For the purpose of detecting a contamination, the desorption laser, which transfers the prepared analyte molecules into the gaseous phase and ionizes them by accurately bombarding the sample sites coated with samples, is directed once or several times at the areas between the individual sample sites 102, and is activated so that the emitted laser light pulse hits a predetermined point on the area between sample sites, see black rectangles 104 in FIG. 1. This is carried out in certain phases of a deposition procedure, or alternatively of an analytical measurement procedure. If these points of the areas between sample sites are contaminated with substance material which should never have got there, then the laser energy produces ions which can be mass-selectively acquired and detected with a mass analyzer, for example a time-of-flight mass spectrometer. This obviates the need to use additional optical imaging apparatus, as is known from the Prior Art, thus significantly reducing the apparatus and procedural effort required for the contamination test.

So if ions are detected at a point on the sample support where none should be present, i.e., on an area between sample sites, this is an indication of contamination and can lead to appropriate corrective measures. It is possible, for example, to provide the sample sites adjacent to a contaminated point with a digital or electronic label, which could be called "suspicion of contamination", for example, in order to draw a user's attention to the fact that the spectra obtained from these sample sites are possibly falsified by cross-contamination and require special attention during the evaluation. It is also possible to alert a user immediately to a positive indication of contamination via an acoustic, optical or other type of alarm signal while the procedure is still being carried out, so that the points identified can be inspected more closely.

In FIG. 1, several sampling patterns are depicted by the rectangles 104, which can be used all together, in turn or as alternatives. A very time-saving type is shown in row 7 of the sample site matrix, where every area between two adjacent sample sites 102 in the same row is sampled just once with the desorption laser; in this example centrally on an imaginary line connecting the centers of the sample sites 102. This type of sampling is especially suitable for procedures where prepared sample sites (A-|1; A-|2; etc.) are examined row by row for analyte molecules. In this case the positioning device which moves the light beam guide of the desorption laser and the sample support 100 relative to each other can, in an intermediate step, position the desorption laser so as to sample between two sample sites before it is directed at the next sample site to be analyzed. It is essentially unimportant here whether the positioning is carried out via an xy shift of the sample support, a change in the axis along which the laser light is incident, or both. All conceivable relative positioning devices shall be covered by the invention described here. Furthermore, it is understood that the investigation can take place row by row (A-I1; A-I2; etc.) and/or column by column (A1-7; B1-7; etc.).

In addition to the sample sites immediately adjacent in a row (1-7) and/or a column (A-I), the areas between sample sites can also be sampled at the point where four sample sites are diagonally closest. This is depicted in FIG. 1, by way of example, with the aid of the sample site groups G6, G7, H6 and H7 and also H5, H6, I5 and I6, where a sampling point is indicated at the intersection of the imaginary diagonal lines connecting these four sample sites. With this embodiment, it is also possible to check the slightly lower risk of contamination across diagonal separations.

In addition, FIG. 1 shows, with the aid of sample sites B2, D3 and F4 as an example, the density and/or frequency with which the surroundings of a sample site 102 can be sampled in order to detect any contamination. In the case of sample site B2, there are fourteen sampling points, which are arranged more or less in a circle around the sample site; for D3 there are seven, and for F4 five. These numbers must be seen only as illustrating the method, but not limiting it. In principle, the higher the repetition rate of the desorption laser, i.e. the higher the frequency with which the laser shots can be fired, the more sampling points can be targeted per time period in order to check for contamination. Repetition rates of 2 to 10 kilohertz or more prove to be helpful here. It is also particularly favorable if the MALDI ion source is coupled to a fast mass analyzer, such as a time-of-flight mass spectrometer. But it is also possible to use other types of mass analyzer, depending on the setting of the repetition rate.

Figure 3A:
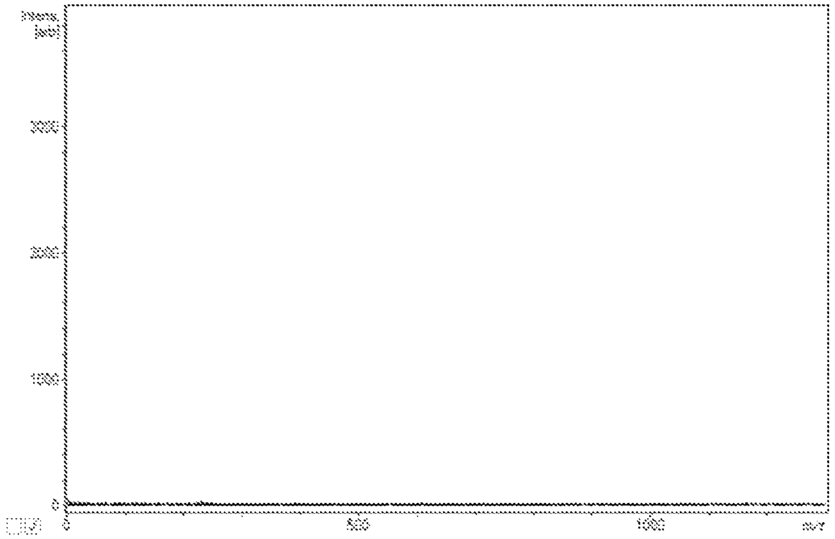
FIG. 3A shows the (zero) spectrum of a MALDI time-of-flight measurement when an uncoated area between sample sites is sampled by the desorption laser (empty spectrum or zero signal).
Figure 3B:
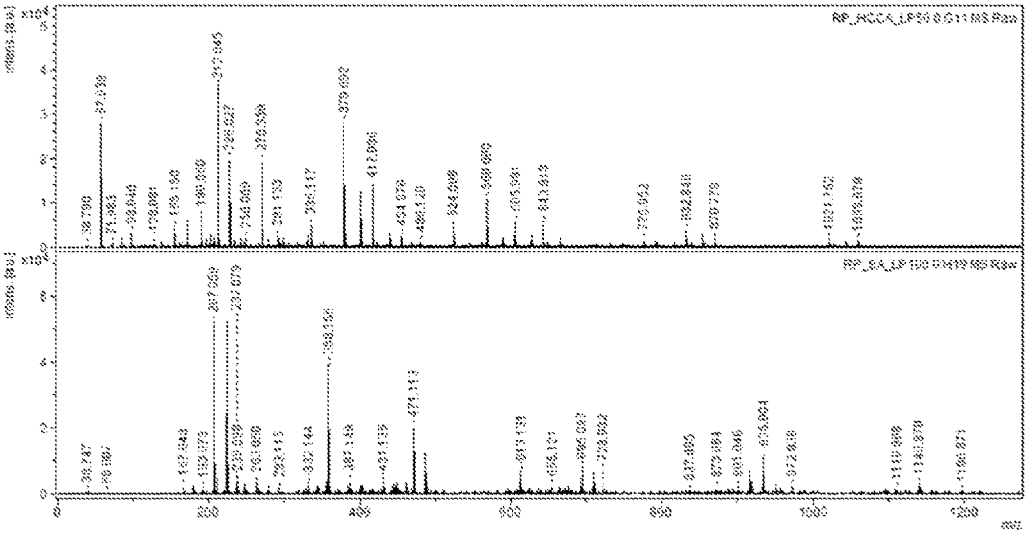
FIG. 3B shows two measured MALDI time-of-flight mass spectra of matrix ions (molecular ions and cluster ions) of α-cyano-4-hydroxycinnamic acid, in the upper part of the diagram, and sinapic acid, in the lower part of the diagram.

FIGS. 3A and 3B show mass-spectrometric signals acquired with an ion detector. One signal has no ion signature (FIG. 3A), in other words a zero signal, and the other has a specific ion signature (FIG. 3B). The ion signatures in FIG. 3B originate from α-cyano-4-hydroxycinnamic acid, in the upper part of the diagram, and sinapic acid, in the lower part of the diagram. They contain not only ionized matrix molecule ions but also matrix molecule cluster ions, labeled in each case, as they typically occur with MALDI ionization of these matrices. For the sample support in FIG. 1, the areas between sample sites are uncoated and often consist of bare metal. If a desorption laser samples such a metal surface, the mass-spectrometric signal can look like the one shown in FIG. 3A, i.e., without any detectable ion signature, or generally without a detectable ion signal above the noise.

If, on the other hand, matrix solution from a sample site 102 gets onto an area between sample sites in the course of a preparation, or if it is applied there unintentionally, sampling with the desorption laser at this point on the area between sample sites will produce a mass-spectrometric signal with a characteristic ion signature, as shown in FIG. 3B; this signal depends on the matrix used for preparing the samples. It is understood that the two matrix ion spectra from FIG. 3B are only examples of an ion signature indicating a contamination, and that there are further examples, and especially alternative matrix substances, which are not all stated or pictured here for reasons of clarity and brevity.

Figure 2:
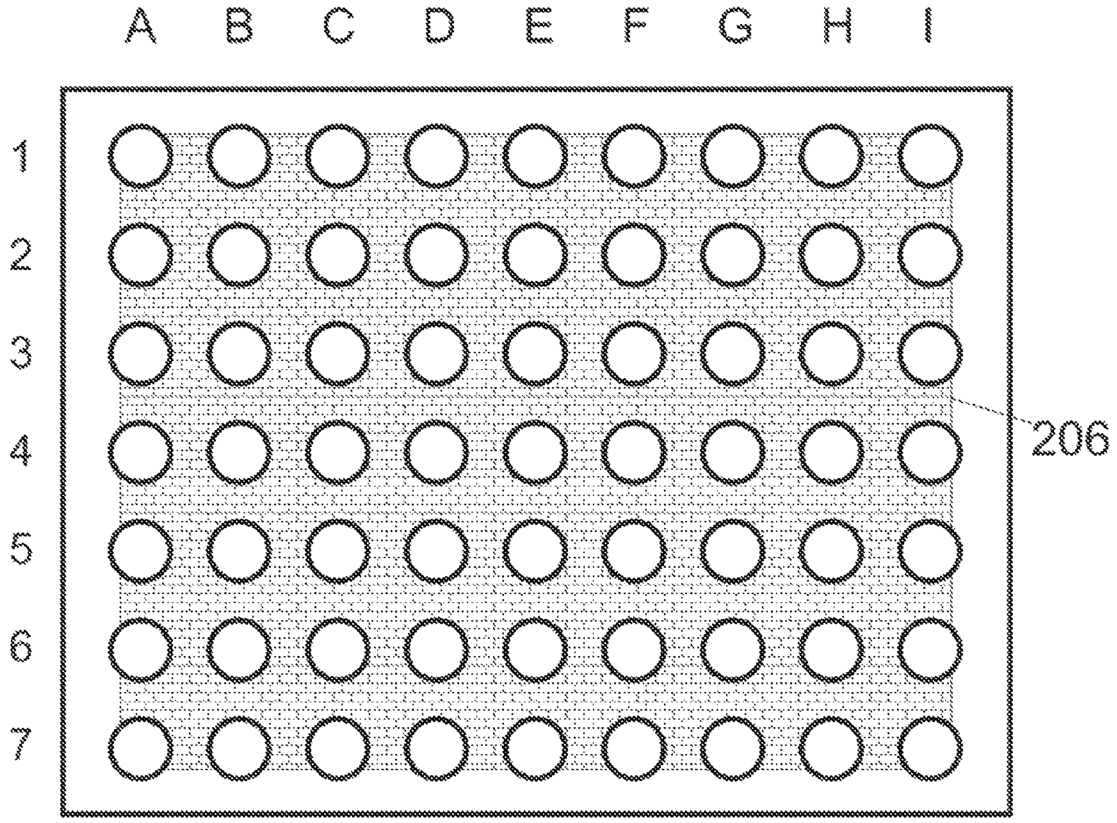
FIG. 2 shows a MALDI sample support similar to the one in FIG. 1, on which the areas between sample sites are coated with a substance (hatching) which produces a characteristic ion signature when bombarded by a laser.

Regarding a further embodiment, FIG. 2 shows a similar image to FIG. 1. The difference lies in the signal which is defined for an area that is not contaminated during the preparation. In the case of the sample support from FIG. 2, the areas between sample sites are coated with a substance 206, which, when sampled with a desorption laser, exhibits a characteristic signal shape, for example a characteristic ion signature, in the detector signal interrogated in temporal relation to the sampling. This substance can be a matrix substance, for example, as can be seen in FIG. 3B. In the case of a sample support with pre-coated areas between sample sites, a contamination could be a difference between the detected ion signature and the expected characteristic ion signature. If, in an example, the areas between sample sites on a sample support are coated with cyano-4-hydroxycinnamic acid (hatched area 206 in FIG. 2), and the samples on sample sites 102 are prepared with sinapic acid, an ion signature as in the upper part of FIG. 3B would indicate a clean area without contamination, whereas the presence of sinapic acid on the sampled areas between sample sites would, with high probability, result in a superposition of the two panels of FIG. 3B. This would be different to the pure cyano-4-hydroxycinnamic acid spectrum, and would be interpreted as contamination.

The invention should naturally also include the case where the matrix incorrectly applied to the area between sample sites covers the base coat layer of the other matrix so completely that only the sinapic acid signature from FIG. 3B is detected by sampling with the desorption laser in the explained example. In any case, the result is a difference to the pure cyano-4-hydroxycinnamic acid signature as a reference signal and this difference is taken as an indicator of contamination.

In a very simple version of the method, when the clean state of the area between sample sites is defined by a zero signal such as the one shown in FIG. 3A, it may be sufficient to acquire the signal of the ion detector in a mass-independent way, i.e. not resolved according to m/z masses. The integral over all the channels shown in FIG. 3A would result in an intensity value close to zero, for example, and would indicate a clean area within the tolerance range of the noise. In contrast, an intensity integral over the spectra shown in FIG. 3B would result in a value significantly higher than the noise, which would suggest contamination. In some embodiments it can also be worthwhile carrying out a mass-selective measurement with the mass spectrometer, but one which is limited to a narrow mass range. In the upper part of the diagram shown in FIG. 3B, there is a high intensity peak at 212.045 u (atomic mass unit=dalton), for example. The time-of-flight mass spectrometer used in this example could therefore be limited to the transmission of ions in the range from, say, 211.5 u to 212.5 u.

Alternatively, the time-of-flight mass spectrometer can transmit ions in a larger mass region, although the ion detector is only interrogated in a narrow mass range. The intensity of an ion signal acquired in such an isolated way will nevertheless be sufficient in most cases to exceed the omnipresent noise in order to indicate contamination.

The invention has been described above with reference to different, special example embodiments. It is understood, however, that various aspects or details of the invention can be modified without deviating from the scope of the invention. In particular, measures disclosed in connection with different embodiments can be combined in any way if this appears feasible to a person skilled in the art. In addition, the above description serves only as an illustration of the invention and not as a limitation of the scope of protection, which is exclusively defined by the enclosed Claims, taking into account any equivalents which may possibly exist.

What is claimed is:

1. A method for the detection of an incorrect deposition on a MALDI sample support which has several separate sample sites, wherein during or after the preparation on the sample support, an area located between two sample sites is sampled with a desorption laser, and a signal of an ion detector in a mass spectrometer is acquired in temporal relation to the sampling, and the signal is examined for the presence of a signal shape which indicates incorrect deposition.

2. The method according to claim 1, where the signal recorded by the ion detector has a mass-independent intensity value, and the signal shape indicating incorrect deposition is an intensity value which is above an intensity threshold essentially determined by noise.

3. The method according to claim 1, where the signal recorded by the ion detector is a mass-resolved mass spectrum, and the signal shape indicating incorrect deposition is an ion signature in the mass spectrum which deviates from a predetermined reference signature.

4. The method according to claim 3, where the presence of MALDI matrix ions in a mass-resolved mass spectrum is defined as an indication of incorrect deposition.

5. The method according to claim 3, where the areas between sample sites are coated with a substance which has a characteristic ion signature, and a difference between the characteristic ion signature and the ion signature in the mass-resolved mass spectrum is defined as an indication of incorrect deposition.

6. The method according to claim 5, where the substance exhibiting a characteristic ion signature is a matrix substance which differs from the matrix substance used for preparing samples on the sample support.

7. The method according to claim 1, where the adjacent sample sites are digitally or electronically labeled when a signal shape indicating incorrect deposition is detected from an area between these sample sites.

8. The method according to claim 1, where an area around a sample site is sampled along the whole of its periphery with the desorption laser and examined for incorrect depositions before the sample site is investigated analytically.

9. The method according to claim 1, where a selected point on an area between two adjacent sample sites is sampled with the desorption laser and examined for incorrect depositions.

10. The method according to claim 1, where a positioning device aligns the sample support and a light beam guide of the desorption laser with respect to each other in such a way that the desorption laser can target an area between sample sites.

11. The method according to claim 1, where a repetition rate of the desorption laser is one to ten kilohertz.

12. A method for the mass-spectrometric detection of analyte molecules ionized with the aid of MALDI, comprising:

providing a sample support having several separate sample sites and being prepared with samples;

directing a desorption laser at different sample sites in succession and activating it in order to ionize and detect any analyte molecule(s) prepared there; and sampling an area around a next sample site to be bombarded with the desorption laser in order to deduce the presence of contamination from a signal of an ion detector in a mass analyzer, which is interrogated in temporal relation to the sampling.

13. The method according to claim 1, where the mass spectrometer is a time-of-flight mass spectrometer.

14. The method according to claim 6, where the matrix substance used for preparing samples and the substance exhibiting the characteristic ion signature are two different materials, one being sinapic acid and the other being cyano-4-hydroxycinnamic acid.

15. The method according to claim 9, where the point is located where four sample sites are diagonally closest.

16. The method according to claim 1, where a user is alerted via an acoustic, optical or other type of alarm signal while the method is still being carried out, when a positive indication of contamination is found.

17. The method according to claim 1, where there is no need to use additional optical imaging apparatus for the incorrect deposition to be detected.

18. The method according to claim 10, where the positioning device comprises at least one of an XY stage and tilting (micro)mirrors.

19. The method according to claim 1, where the desorption laser is a solid state laser.

20. The method according to claim 1, where the sample support has one of 96, 384, and 1536 sample sites.

* * * * *